United States Patent
Alagianambi

(10) Patent No.: US 11,907,820 B2
(45) Date of Patent: Feb. 20, 2024

(54) AUTOMATED BIAS ELIMINATION IN NEGOTIATED TERMS

(71) Applicant: LendingClub Corporation, San Francisco, CA (US)

(72) Inventor: Ramaswamy Alagianambi, San Francisco, CA (US)

(73) Assignee: LendingClub Corporation, San Francisco, CA (US)

( * ) Notice: Subject to any disclaimer, the term of this patent is extended or adjusted under 35 U.S.C. 154(b) by 1242 days.

(21) Appl. No.: 16/203,404

(22) Filed: Nov. 28, 2018

(65) Prior Publication Data

US 2020/0168231 A1    May 28, 2020

(51) Int. Cl.

| | |
|---|---|
| G06F 40/00 | (2020.01) |
| G06N 20/20 | (2019.01) |
| G10L 17/26 | (2013.01) |
| G10L 25/63 | (2013.01) |
| G06V 10/776 | (2022.01) |
| G06F 40/30 | (2020.01) |

(52) U.S. Cl.
CPC .......... *G06N 20/20* (2019.01); *G06V 10/776* (2022.01); *G10L 17/26* (2013.01); *G10L 25/63* (2013.01); *G06F 40/30* (2020.01)

(58) Field of Classification Search
CPC ......... G10L 17/26; G10L 25/63; G10L 15/22; G10L 17/00; G10L 25/00; G10L 15/00; G06N 20/00; G06V 40/174; G06F 40/20; G06F 40/30; G06F 40/35; G06F 40/295
See application file for complete search history.

(56) References Cited

U.S. PATENT DOCUMENTS

| | | | | |
|---|---|---|---|---|
| 5,504,837 | A * | 4/1996 | Griffeth | .............. H04Q 3/0041 706/50 |
| 9,846,844 | B2 * | 12/2017 | Hecht | .................... G16H 50/20 |
| 10,068,301 | B2 * | 9/2018 | Kogut-O'Connell | ....................... G06Q 10/10 |

(Continued)

OTHER PUBLICATIONS

A. Elfatatry and P. Layzell, "Software as a service: a negotiation perspective," Proceedings 26th Annual International Computer Software and Applications, 2002, pp. 501-506, doi: 10.1109/CMPSAC.2002.1045054. (Year: 2002).*

(Continued)

*Primary Examiner* — Paras D Shah
(74) *Attorney, Agent, or Firm* — Hickman Becker Bingham Ledesma LLP

(57) ABSTRACT

Techniques are provided for improving computers as tools for assisting in negotiations. Specifically, techniques are provided for using a trained machine learning system to predict the likelihood that a party to a negotiation intends to comply with terms that are under consideration. In some negotiations, each party of a negotiation may use the techniques described herein to determine terms to offer the other party. In such situations, both parties may be both terms-receiving parties and terms-offering parties. By using a trained machine learning system to predict the intent of a party, the possibility of human bias significantly reduced, allowing proposed terms to be based more on objective facts and predictive indicators rather than the prejudices of the agents that have been delegated the responsibility of proposing terms.

17 Claims, 5 Drawing Sheets

(56) References Cited

U.S. PATENT DOCUMENTS

| | | | | |
|---|---|---|---|---|
| 2004/0088264 | A1* | 5/2004 | Preist | G06Q 50/188 |
| | | | | 705/80 |
| 2012/0262296 | A1* | 10/2012 | Bezar | G10L 15/02 |
| | | | | 704/200 |
| 2017/0213190 | A1* | 7/2017 | Hazan | G06F 16/951 |
| 2017/0287038 | A1* | 10/2017 | Krasadakis | G06Q 30/0201 |

OTHER PUBLICATIONS

K. Hashmi, E. Najmi, Z. Malik and A. Rezgui, "A Framework for Automated Service Negotiation," 2013 IEEE 6th International Conference on Service-Oriented Computing and Applications, 2013, pp. 233-240, doi: 10.1109/SOCA.2013.27. (Year: 2013).*

Cadilhac, Anais, et al. "Grounding strategic conversation: Using negotiation dialogues to predict trades in a win-lose game." Proceedings of the 2013 Conference on Empirical Methods in Natural Language Processing. 2013. (Year: 2013).*

Lau, Raymond YK. "Machine learning for negotiation knowledge discovery in e-Marketplaces." IEEE International Conference on e-Business Engineering (ICEBE'07). IEEE, 2007. (Year: 2007).*

\* cited by examiner

AUTOMATED BIAS ELIMINATION IN NEGOTIATED TERMS

FIELD OF THE INVENTION

The present invention relates to automation of negotiated terms and, more specifically, to automated bias elimination in negotiated terms.

BACKGROUND

When negotiating terms of an agreement, each party to the agreement must consider numerous factors to determine what terms would be "optimal" for that party. As used herein, "optimal" for a particular party does not refer to those terms, most favorable to the particular party, to which the other party will agree. Rather, "optimal" for the particular party refers to those terms, most favorable to the particular party, to which the other party will actually comply. Stated another way, there is little value in agreeing to terms that are too burdensome to the other party that the likelihood of the other party's compliance is unacceptably low.

To determine whether terms are too burdensome on the other party to be optimal, one must consider (a) the other party's ability to comply, and (b) the other party's willingness to comply. With respect to the other party's ability to comply, this can often be accurately assessed by objective information. For example, assume that a lender is negotiating terms of a revised payment plan with a borrower that claims to be unable to meet the terms of an original payment plan. Under these circumstances, the borrower's ability to comply with new terms may be determined objectively based on information contained in the borrower's financial statements. With respect to the other party's willingness to comply, this is far more difficult to determine objectively.

In theory, to determine a party's willingness to comply with terms that are under negotiation, one could subject that party to a polygraph test. However, subjecting a party to a negotiation to a polygraph test would be expensive, inconvenient, time consuming, and potentially insulting. However, in the absence of such tests, one party's prediction of the willingness of the other party may be heavily influence by personal bias. For example, a first person representing a lender may conclude that a borrower is willing to repay 80% of an outstanding loan, while a second person representing the same lender may conclude that the same borrower is not willing to repay 80% of the same outstanding loan. As a result, the first person may offer terms that, even if agreed upon, the borrower will not comply with. On the other hand, the second person may offer terms that require payback of an amount far less than the borrower is actually willing to pay. The difference between their perceptions of willingness may be due to a variety of factors that have nothing to do with the borrower's actual willingness.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
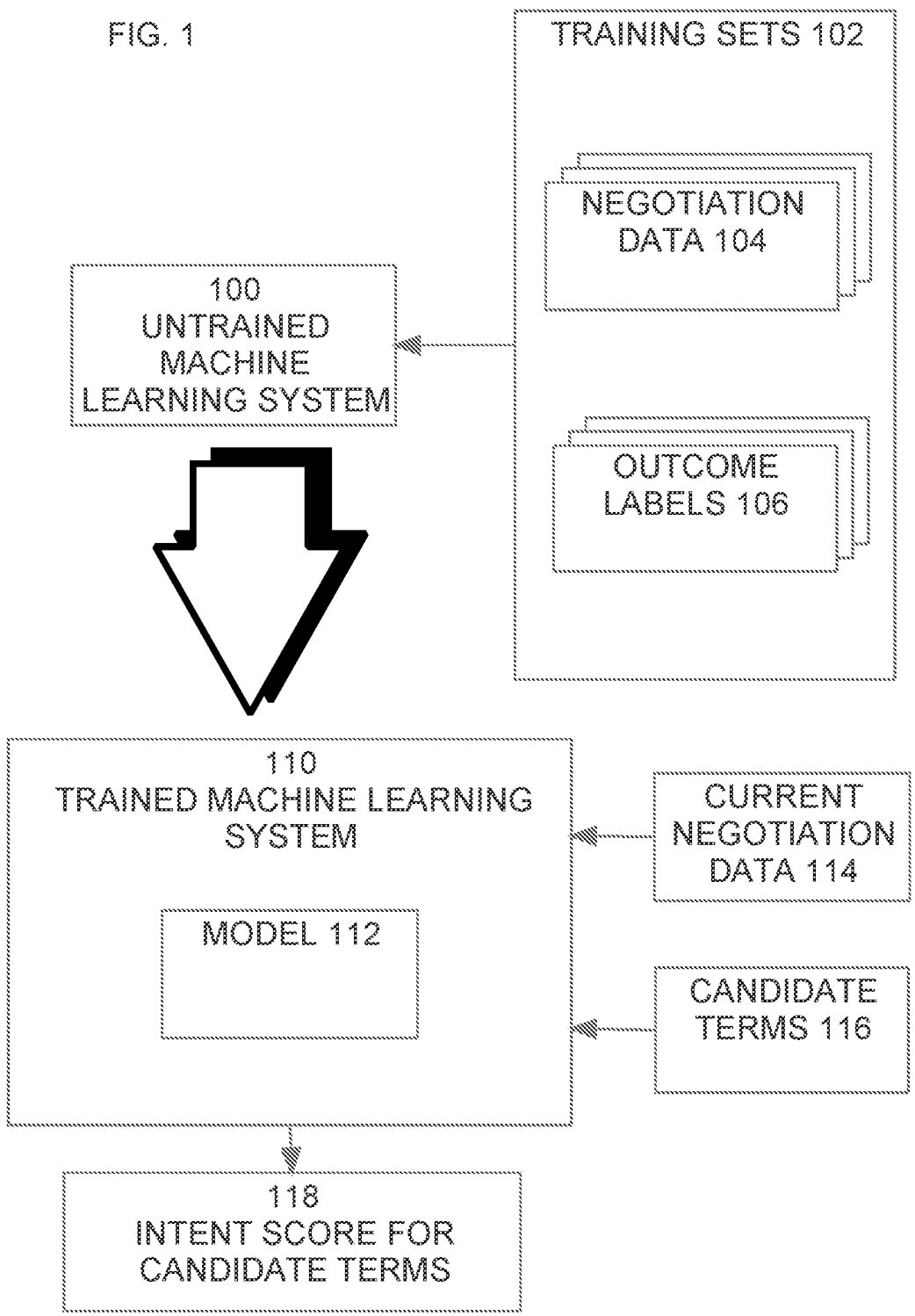
FIG. 1 is a block diagram of a machine learning system trained to predict intent of a target party during negotiations.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for improving computers as tools for assisting in negotiations. Specifically, techniques are described herein for using a trained machine learning system to predict the likelihood that a party to a negotiation intends to comply with terms that are under consideration. The party whose intent is being predicted using the techniques described herein is referred to herein as the "target party". The party that is attempting to assess the intent of the target party in order to determine the optimal terms to offer is referred to herein as the "intent-assessing party". In some negotiations, each party of a negotiation may use the techniques described herein to determine terms to offer the other party. In such situations, both parties may be both terms-receiving parties and terms-offering parties.

Because the intent prediction is made automatically using a machine learning system that has been trained using actual data from prior negotiations, the prediction is less likely to reflect the personal bias that is inherent in human decisions. In particularly, the intent prediction is likely to filter out any bias based on inappropriate considerations, such as race, age or gender to the party in question.

For the purpose of illustration, techniques for using a trained machine learning system to eliminate bias shall be described in the context where the negotiations relate the restructuring of a loan agreement between a borrower (the target party) and a lender (the intent-assessing party). In such negotiations, it is critical that the renegotiated terms be terms with which the borrower actually intends to comply. In such negotiations, the lender is injured if the renegotiated terms are much lower than what the borrower is willing and able to pay. Conversely, both parties are ultimately injured if, during the restructuring negotiations, the borrower agrees to terms with which the borrower does not actually intend to comply.

While the intention prediction techniques described herein shall be explained using a loan restructuring negotiation as an example, the techniques are not limited to any particular type of negotiations. Thus, the techniques are equally applicable to negotiations (or renegotiations) with contractors, service providers, sales, etc. There is virtually no limit to the type of negotiations in which the techniques described herein may be used to eliminate human bias in the determination of the willingness of a target party to comply with terms in question.

Loan Restructuring Considerations

Restructuring for loan payments or settling a loan often merely accounts for what the borrowers say they can or cannot do. Restructuring a loan based only on borrower's assertions about their ability to pay could not only lead to a bad customer experience, but may also result in adverse actions such as the filing for bankruptcies or causing borrowers to seek third parties that may not act in the best interest of customers.

Existing payment restructuring processes fail to take into account the true intent or the ability of customers to keep up with proposed payment plans. Further, conversations with customers for restructuring payments or settling for a loan are treated as negotiations, thereby limiting the option for providing the best outcome for everyone involved.

According to one embodiment, using the techniques described herein, a payment plan can be drafted dynamically based on (a) customers intent predictions (with computerized bias elimination) and (b) their ability to make payments. Customers intent can be derived dynamically from the customers' conversational attributes that could be deduced by interpreting audio, video, text, or other means of communication.

Using customers' intent and ability as added signals to the payment plan generation process can help with a better payment plan that could lead to positive outcomes for borrowers, investors, and any other stakeholders in the marketplace/platform. Specifically, servicing a loan involves maximizing the returns for investors (who backed the loans in the first place). Not all the customers who get a loan can make payments due to several reasons. When things don't go as planned, customers struggle to make the promised payments. There are generally two options—(a) altering the payment plan includes restructuring or settling the loan (b) filing for bankruptcy.

Option (a)—Altering the payment plan, is a much better option. An alteration could mean any or all of the following: the time of payment, amount, the method of payment, type of payment etc. An example could be settling the loan for a lower amount or a cheaper rate or a payment plan that extends the time of the term. However, altering a payment plan is not easy, as it involves many variables such as customers' capacity to pay back, investors' risk and returns appetite, incentives of who's moderating the payment plan creation, etc.

The techniques described herein take into account the different variables mentioned above to come up with better payment plans in order to maximize the returns for the investors and at the same time leaving borrowers with better choices, so they are not forced to the edge. Deciding on whether a payment plan is hurting or helping customers is a tricky balance unless the system/process takes into account the customers' intent and ability. As shall be described in greater detail hereafter, the techniques herein allow for automated elimination of human bias in the 'intent' detection. In one embodiment, customers' "ability" is deduced by using the value of total assets and liabilities and any forecasting thereof.

Generating a Bias-Free Intent Score

Using the techniques described herein, a computer-generated "intent score" is assigned to a set of candidate terms. The set of candidate terms may be, for example, the terms that a lender is considering to offer for a restructured loan, in a situation where a borrower has indicated an inability to comply with the original terms of a loan.

The intent score is computer-generated by a trained machine learning system based on the actual outcomes of prior negotiations. Because the intent score is computer-generated based on objective data about prior negotiations, the intent score eliminates the possibility of human bias in the intent detection aspect of the negotiating process.

Referring to FIG. 1, the training of a machine learning system 100 is based on training sets 102 containing (a) "negotiation data" 104 from prior negotiations, and (b) "outcome labels" 106 that indicate the outcome of the prior negotiations. In the context of restructuring a loan, the training sets 102 would contain negotiation data 104 with information about prior loan restructuring negotiations, including the terms thereof, as well as outcome labels 106 that reflect whether the borrowers complied with the terms of the restructured loans.

As the training sets 102 are fed to the machine learning system 100, the machine learning system becomes a trained machine learning system 110 that includes a model 112 for predicting the outcome of future negotiations. More specifically, the model 112 predicts, for a set of candidate terms 116 in a negotiation, whether a target party to the negotiation intends to comply with the candidate terms. In one embodiment, training sets 102 also include objective information about the respective borrowers actual ability to pay at the time of negotiation.

Once such a model 112 has been generated, negotiating data 114 for a current negotiation, including a set of candidate terms 116, are fed into the trained machine learning system 110. Negotiating data 114 may also include objective data about the target party's current ability to pay. Based on the model 112, the trained machine learning system 110 generates data that estimates the likelihood that adoption of the candidate terms 116 in the current negotiation will result in a successful outcome. More specifically, the trained machine learning system 110 generates an intent score 118 that estimates the likelihood that a target party to the current negotiation intends to comply with the set of candidate terms 116.

Outcome Labels

As mentioned above, before the negotiation data 104 of prior negotiations is fed to the machine learning system 100, the prior negotiations are assigned outcome labels 106. In one embodiment, the outcome labels include "intent-present" and "intent-absent". Specifically, the intent-present label is assigned to each prior negotiation that produced terms with which the parties actually complied. For example, the intent-present label can be assigned to each loan restructuring negotiation where the borrower complied with the terms of the restructured loan. Because the target party complied with the terms in each intent-present negotiation, it may be presumed that at the time the terms of the intent-present negotiation were negotiated, the target party actually intended to comply with the terms in question.

A negotiation that produced terms with which a target party ultimately did not comply is referred to herein as a "failed-outcome" negotiation. For example, a loan restructuring operation would qualify as a fail-outcome negotiation if the borrower fails to comply with the terms of the restructured loan. However, not all failed-outcome negotiations necessarily qualify as "intent-missing" negotiations. Specifically, failed-outcome negotiations include both (a) "intent-missing" situations in which the non-compliant target party did not intend to comply with the terms that were negotiated, and (b) "changed-circumstance" situations in which the non-compliant target party intended to comply but encountered unforeseen circumstances that hindered compliance (e.g. acts of nature, illness, loss of an income source, etc.).

To make the model more accurate at predicting intent, it is preferable to use outcome labels that distinguish between "change-circumstance" negotiations and "intent-missing" negotiations. In one embodiment, "change-circumstance" negotiations are excluded from the training sets 102 used to train the machine learning system 100. For example, the training sets 102 may exclude situations where a borrower defaults on a restructured loan due to an unforeseen event, such as a death or injury. In one embodiment, "changed-circumstance" negotiations are identified and excluded from the training sets by a human. In alternative embodiments, "changed-circumstance" negotiations are identified and excluded from the training sets automatically based on information contained in the negotiating data. In yet another embodiment, both "changed-circumstance" and "intent-missing" negotiations are used to train machine learning system 100, but are distinguished by the outcome labels 106 to which they are assigned.

In one embodiment, "intent-missing" negotiations are automatically identified and included in the training sets 102 based on objective data that indicates that the non-compliant target party had the capacity to comply at the time of non-compliance. For example, if the objective capacity-indicating data indicates that a borrower's capacity to comply with the terms of a restructured loan did not change between the time the loan was restructured and the time that the borrower defaulted, the negotiation may be labeled as "intent-missing". In such situations, it is assumed that the non-compliance is due to a lack of willingness, rather than a lack of capacity.

Negotiation Data

As mentioned above, to train the machine learning system 100, the machine learning system 100 is fed negotiation data 104 from prior negotiations. In one embodiment, the negotiation data 104 includes various attributes from numerous previous intent-present and intent-missing negotiations, as well as labels indicating, for each prior negotiation, the outcome of the negotiation.

The attributes may include objective data about the target party's ability to pay, as well as attributes derived by analyzing interactions between the parties involved in the prior negotiations. Such interactions may take the form of video and/or audio recordings of in-person conversations, phone conversations and video chats. The interactions include textual interactions, such as email messages, text messages, instant messages, etc. The attributes may be derived from the content of the interactions, the timing of the interactions, the mode of the interactions, etc. With respect to textual interactions, the attributes may include the use of capitalization, word choice, spelling, punctuation, grammar, use of complete sentences, etc.

The attributes derived from the interactions, and included in the negotiation data that is fed into the machine learning system 100, include attributes that relate to the subtle indicators that humans unconsciously convey of whether they are being sincere. Such attributes may include, but are not limited to:

a target party's tone of voice,
a target party's choice of words,
the frequency that a target party uses certain words,
a target party's voice modulation,
a target party's time of picking or making a call,
where the target party is calling from,
who the target party is calling with
the length of pauses before the target party answers questions
whether the receiving-party circumvents a question
types of words used by the target party
amount of time (or rings) until the target party answers a call If the call is a video chat, an in-person meeting, or any other situation in which the borrower's visual appearance is available, the attributes may also include:

the target party's facial expressions,
how many times the target party nods their head,
the target party's attentiveness,
where the target party focusses their eyes, etc.

According to one embodiment, the intent score is heavily weighted on the conversational attributes, particularly when the conversation medium involves (audio/video). The conversational attributes could be 'choice of words', 'frequency of utterance of selected words', 'completion of sentences', 'sentiment in a sentence', 'time lag between responses', 'questions vs. statements', 'volume of the call', 'place of the call', 'time of the call', and 'duration of the call'. Conversational attributes could be gathered from any of the voice, visual, or text-based conversations or interactions using a user interface. Further, the conversation could be either synchronous or asynchronous.

The Intent Score

As explained above, during training, the machine learning system 100 generates a model for predicting the degree to which a target party intends to comply with negotiated terms. Once trained, the trained machine learning system 110 uses this model 112 to generate an intent score 118 for a set of candidate terms 116 that are being considered in a not-yet-finalized negotiation. Specifically, the candidate terms 116 and current negotiation data 114 (attributes derived from the interactions of a target party involved in the current negotiation) are fed to the trained machine learning system 110. Based on the model 112, the trained machine learning system 110 generates an intent score 118 for the candidate terms.

According to one embodiment, the intent score 118 is based on quantifying whether a given customer has the intent (in which case positive) or not (in which case negative) or a net neutral state. Further, the intent score is accompanied with a confidence score, which indicates the level of confidence from a scale of 1-100.

Figure 2:
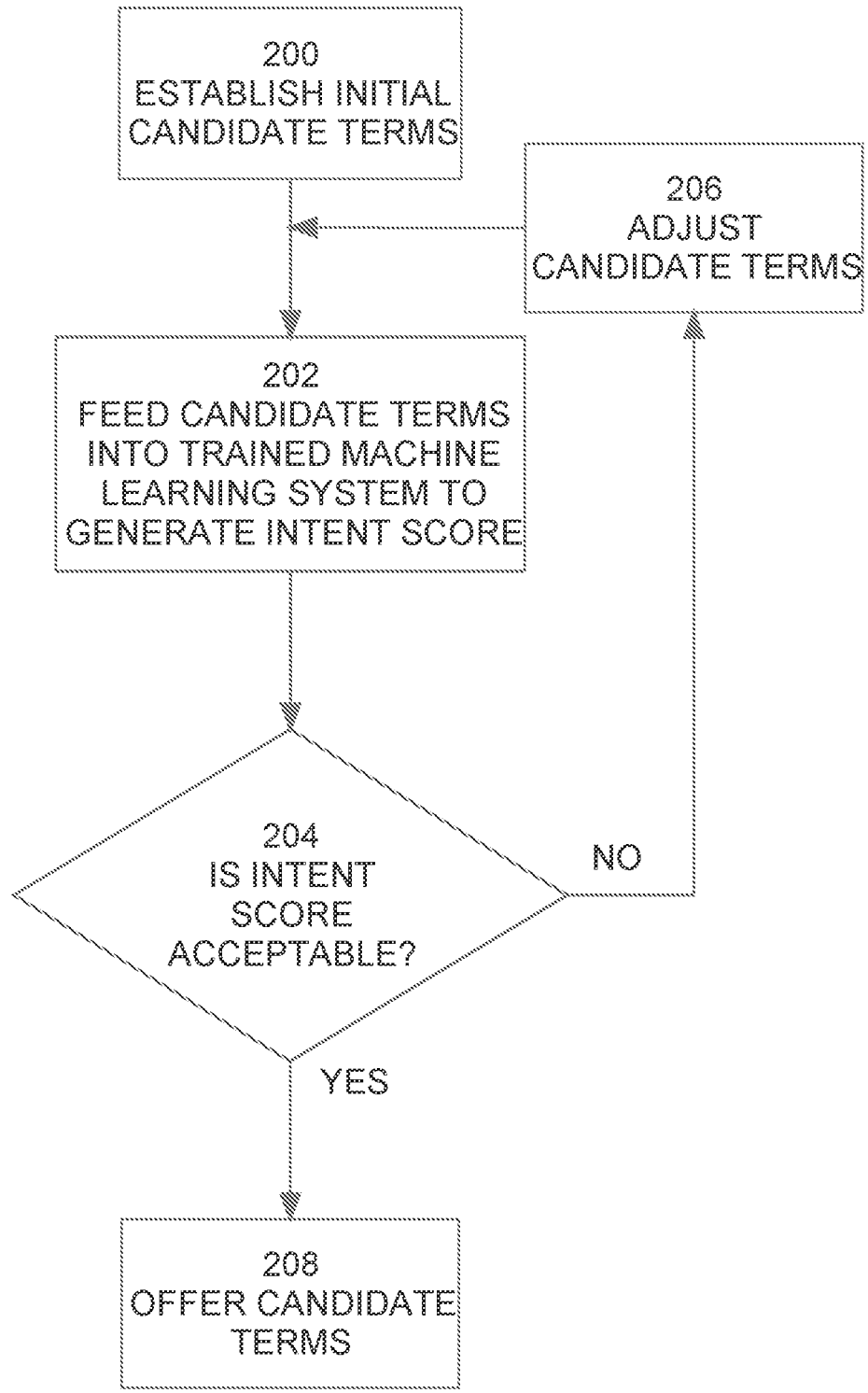
FIG. 2 is a flowchart illustrating the iterative process of adjusting candidate terms, according to an embodiment.

In one embodiment, the formulation of candidate terms 116 is an iterative process. Referring to FIG. 2, it is a flowchart illustrating the iterative process of adjusting candidate terms, according to an embodiment. Specifically, a step 200, an initial set of candidate terms is established. The initial set of candidate terms 116 may be terms for which compliance may be relatively difficult. For example, in the context of negotiations to restructure a loan, the initial candidate terms may call for payback of 100% of the original loan, but with a longer payment schedule (to decrease the amount of the monthly payments).

At step 202, the initial set of candidate terms 116 is fed to the trained machine learning system 110. At step 204, it is determined whether the intent score is acceptable. If the intent score is not acceptable, control passes to step 206. In one embodiment, control may pass from step 204 to step 206 if the initial set of candidate terms produce a negative intent score, or a positive intent score with low confidence.

At step 206, the candidate terms are adjusted. For example, the new candidate terms may call for payback of 90% of the original loan. After adjusting the candidate terms, the process is repeated by feeding the adjusted terms to the trained machine learning system at step 202. If the intent score 118 produced by the adjusted terms are still unsatisfactory, the process may be repeated until arriving at adjusted candidate terms 116 that produce an intent score 118 that is acceptable. When the candidate terms produce an intent score that is acceptable, control passes from step 204 to step 208, and those candidate terms may be offered in the negotiation.

The criteria used at step 204 for determining whether an intent score is "acceptable" may vary from implementation to implementation. For example, in one implementation, an intent score may be acceptable if the score is positive and the confidence is over 50%. In another implementation, an intent score may be acceptable only if both the score and the confidence are high. For example, if intent scores range from −100 to +100 and confidence scores range from 0% to 100%, an intent score may be considered "acceptable" only if the intent score is +60 or higher and the confidence score is 80% or higher.

In the example given above, the initial candidate terms were relatively difficult to satisfy, and each adjustment produced terms that were relatively easier to satisfy. However, in an alternative embodiment, the initial candidate terms may be easy to satisfy, and the adjustments may produce terms that are relatively more difficult to satisfy. In such an embodiment, the iteration may proceed until arriving at candidate terms that produce an intent score that is unacceptable. In such an embodiment, the negotiator may offer the terms from the iteration immediately preceding the iteration that produced the unacceptable intent score.

Bias-Free Outcomes

Because the negotiation data 114 may differ markedly between two negotiations, the terms offered during the negotiations may also differ markedly, even when the negotiations begin at the same starting points. For example, assume that both borrower A and borrower B have defaulted on their initial loans, and that their initial loans had the same terms. Assume further that the automated intent scoring techniques described herein are used during the restructuring negotiations with both borrowers.

Because the negotiation data for each of the negotiations will differ, any given set of candidate terms may produce different intent scores for the borrowers. Consequently, the restructured loan terms offered to borrower A may differ significantly from the restructured loan terms offered to borrower B (e.g. the restructured loan for borrower A may call for payback of 50% of the initial loan, while the restructured loan for borrower B may call for payback of 70% of the initial loan).

However, unlike negotiations where the offered terms reflect a human's bias-driven assessment of the intent of the other target party, using the techniques described herein ensures that any differences in offered terms is based on empirical data from the current negotiation and prior negotiations, rather than the subconscious bias of the humans involved in the negotiations. That is, borrow B is paying back a higher percentage of the initial loan than borrower A because the negotiation data indicates that borrower B is willing to do so, rather than any bias the lender's representative may have towards borrower A or against borrower B.

Obtaining Useful Negotiation Data

As mentioned above, trained machine learning system 110 determines intent scores for candidate terms based on negotiation data obtained during a current negotiation. Thus, the more indications the negotiation data has regarding the intent of a target party, the more accurate the generated intent scores will be. According to one embodiment, to increase the intent indications in the negotiation data, various mechanisms may be employed to increase interactions that provide such indications. For example, in the context of loan restructuring negotiations, the lender's representative may be provided a list of questions to ask during a phone conversation with the borrower. The questions may be questions that have historically been shown to cause borrower responses that reflect the borrower's intent.

In a similar embodiment, the audio, video and/or text conversations between a lender's representative and a borrower may be monitored by an automated prompting system. Based on an on-the-fly analysis of those conversations, the automated prompting system may provide prompts to the lender's representative of what questions to ask or what comments to make in order to increase the quantity and/or quality of intent indications provided by the borrower.

In one embodiment, an intent-assessing party to a negotiation, such as a lender's representative in a loan restructuring negotiation, may be prompted with preliminary questions that provide a baseline in the same way that those that perform polygraph tests start by asking questions to provide a baseline. Such preliminary questions may include questions for which the answer is known and/or for which it is highly likely that the subject will give an honest answer. Such preliminary questions may include, for example, questions about the borrower's birthdate, children, residence, etc. When generating an intent score, the machine learning system effectively compares the features of the subject's answers (tone of voice, word choice, etc.) to the preliminary questions to the features of the subject's answers to questions that relate to the subject's intent to comply with candidate terms, taking into account similar information about and the outcomes from prior negotiations.

Figure 3:
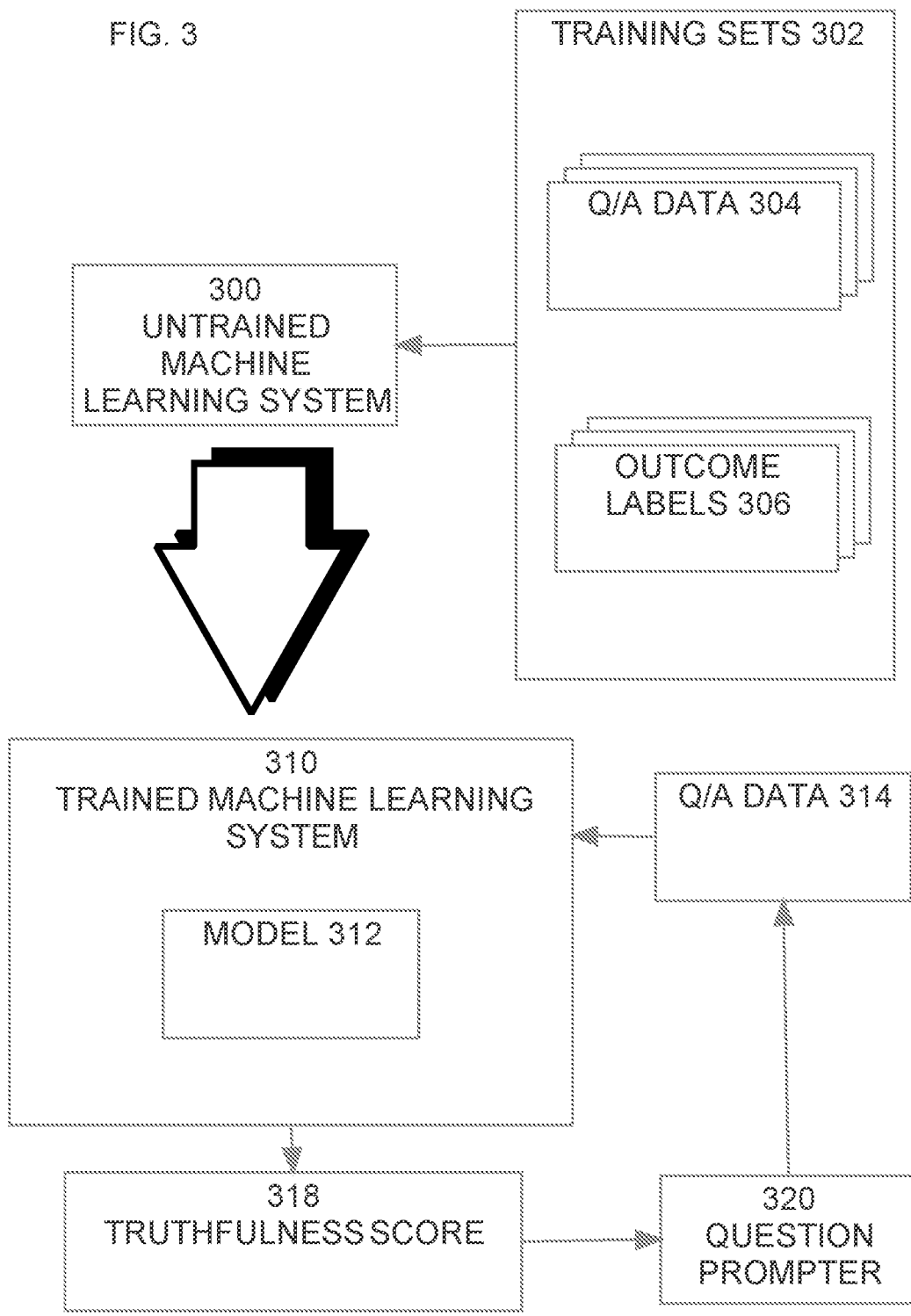
FIG. 3 is a block diagram of a machine learning system trained to help give on-the-fly prompts to a term-offering party during interactions with a term-receiving party.

Referring to FIG. 3, it is a block diagram of a machine learning system trained to help give on-the-fly prompts to a term-offering party during interactions with a term-receiving party. Specifically, an untrained machine learning system 300 is train with training sets 302. Training sets 302 include Q/A data 304 and outcome label 306. Q/A data 304 includes data about questions asked to term-receiving parties, as well as data about their answers. The Q/A data 304 may be, for example, the output of a speech analysis engine that is fed the audio from the conversation in which the questions were asked, and the answers were given. Outcome labels 306 indicate whether the corresponding answers in the Q/A data were truthful, deceitful, non-responsive, etc. The training sets include data from questions asked in prior negotiations, as well as data from question that were asked in previous conversations relating to the current negotiations.

Once trained, the resulting machine learning system 310 has a model 312 that predicts the likelihood that the term-receiving party has given a truthful answer to particular question. For example, during a conversation, the term-offering party may ask the term-receiving party a particular question (question "A"). In response, the term-receiving party may give an answer (answer "A"). After the answer is given, information about both the question and the answer may be fed as Q/A data 314 (produced by feeding the actual audio into a speech analysis engine) to machine learning system 310. In response, machine learning system 314 generates a truthfulness score 318 that indicates the likelihood that answer A is true.

The truthfulness score 318 and a corresponding confidence score are fed to a question prompter 320. Question prompter 320 represents an automated system for providing prompts to a term-offering party during a conversation with a term-receiving party. In the case of real-time conversations, such as video chats, phone calls, etc., the prompts generated by question-prompter may be generated in real-time. The question that question prompter 320 prompts the term-offering party to ask is based, at least in part, on the truthfulness score and confidence score of the previous question.

Other factors that may be used by the question prompter 320 in the question selection process include, but are not limited to: the profile of the target party, past interactions with the target party, etc. In addition, the target prompter may initially prompt with "calibration questions" that the user is likely to answer truthfully, such as birthdate, age, residence, etc. prior to proceeding to questions more related to the current negotiation.

In the present example, after the Q/A data for question A has produced a truthfulness score, question prompter 320 may select a question to follow question A. The question to follow question A may be selected from among several possible follow-up questions (e.g. questions B, C and D) based on the truthfulness score produced for question A. For example, question prompter 320 may be configured to:
select question B if the truthfulness score indicates that answer A is truthful with a high degree of confidence,
select question C if the truthfulness score indicates that answer A is not truthful with a high degree of confidence, and
select question D if the truthfulness score has a high degree of confidence For the purpose of illustration, it shall be assumed that answer A produced a truthfulness score indicates that answer A is truthful with a high degree of confidence. Consequently, question prompter 320 prompts the intent-assessing party with question B. The intent-assessing party then asks question B and the target party answers question B with answer B. The Q/A data for question B is then fed into trained machine learning system 310 to generate a truthfulness score for answer B. This process may be repeated any number of times to produce negotiation data with high number of high-quality intent indications. Because of the high number and quality of intent indications in the negotiation data, the negotiation data is more likely to produce intent scores with relative high confidence scores, when fed into machine learning system 110.

On-the-Fly Determination of Terms

In the examples given above, one machine learning system 310 is trained to detect truthfulness scores for answers given during a negotiation conversation. Those scores are used to decide subsequent questions to ask during the conversation in order to produce negotiation data with a high number of high-quality intend indications. That negotiation data is then fed to another machine learning system 110 that is trained to generate intent scores 118 for candidate terms, to ultimately determine what terms to offer the target party.

In an alternative embodiment, the determination of terms is performed concurrently with the conversation itself. Such an embodiment may make use of a machine learning system that is trained as illustrated in FIG. 4.

Figure 4:
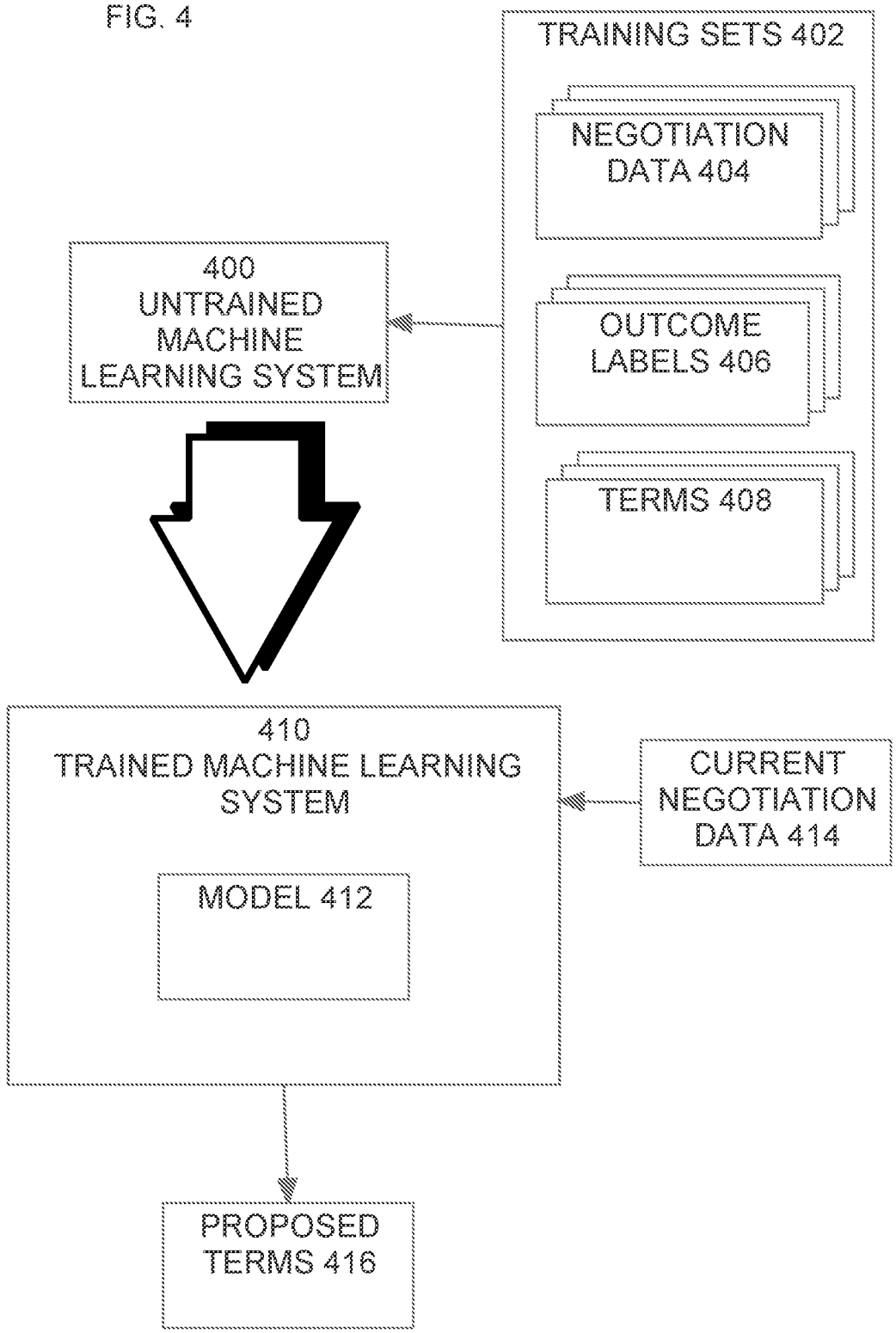
FIG. 4 is a block diagram of a machine learning system trained to predict the optimal terms to offer during negotiations, according to an embodiment.

Referring to FIG. 4, an untrained machine learning system 400 is trained with training sets 402 similar to machine learning system 100. However, rather than being trained to predict a target party's willingness to comply, machine learning system 400 is trained to predict the optimal terms to offer during negotiations. Thus, training sets 402 include negotiation data 404, outcome labels 406, and terms 408 from prior negotiations. For example, for a given prior loan restructuring negotiation, the negotiation data 404 may include the features from the interactions that occurred during the negotiation, outcome labels 406 may indicate whether the borrower conformed to the terms of the restructured loan, and terms 408 may indicate the specific terms of the restructured loan.

Trained machine learning system 400 in this manner produces a trained machine learning system 410 that has a model 412 capable of generating proposed terms 416 based on information from a current negotiation 414. Trained machine learning system 400 may be used in conjunction with trained machine learning system 310 to formulate terms on-the-fly during a negotiation conversation.

Specifically, as explained above with reference to FIG. 3, after each answer is given in a conversation, a truthfulness score for the answer is generated by trained machine learning system 310. As explained above, the truthfulness score 118 may be used as input to a question prompter 320, that prompts the intent-assessing party with a next question to ask. In addition, the current negotiation data (including the Q/A data and the truthfulness score of the question just answered) may be fed into machine learning system 410. Based on model 412, machine learning system 410 generates proposed terms 416 for the present negotiation. Along with the proposed terms 416, trained machine learning system 410 may generate a confidence score that indicates a degree confidence that the target party will comply with the proposed terms 416.

If the confidence score associated with the proposed terms 416 is below a threshold, the intent-assessing party may proceed to ask the next prompted question. When that question is answered, the negotiation data is supplemented based on the new question and answer information, and the negotiation data is once again fed to trained machine learning system 410. Based on the augmented negotiation data, machine learning system 410 generates new proposed terms 416 and a new confidence score. If the new confidence score is still too low, the process may be performed repeatedly, augmenting the negotiation data at each iteration, until either (a) machine learning system 410 produces proposed terms 416 that has a sufficiently high confidence score, or (b) some maximum number of questions have been asked.

Improving the Model

In one embodiment, the model 112 does not remain unchanged after the initial training. Instead, once the outcome of a new negotiation is known, an outcome label is assigned to the new negotiation and the negotiation data, along with its corresponding label, is fed to the machine learning system. Based on the new training data, the machine learning system revises the model 112, thereby increasing the accuracy of the intent scores produced based thereon.

Same-Party Training

In the examples given above, a machine learning system is trained to predict intent/truthfulness of a target party using "negotiation information" derived from prior negotiations with other parties. However, instead of or in addition to negotiation information derived from negotiations with other parties, the machine learning system may be trained based on prior interactions with the target party themselves. For example, at the time that a borrower needs to restructure a loan, the borrower may have many years-worth of interactions with the lender. Those interactions may be in the form of text messages, email, phone calls, video calls, in-person meetings, etc. Those prior interactions may be analyzed an labeled, and then used to train the machine learning system to predict that same target party's intent/truthfulness during a the loan restructuring negotiations.

Restructuring a Loan Example

The techniques described herein for automatically generating questions and for automatically generating terms for a restructured loan may be used in combination. In a system that combines these techniques, a customer support agent or bot begins the payment revision process by asking questions to the target party. Questions form contexts for detecting intent. At each step in the process, agents or bots are guided what questions to ask and each response is subjected to predicting the intent. Further, customers are presented with proposals or part of the plan, thereby creating more context, which allows the opportunity for capturing customer reaction/response.

The intent is derived by an ensemble machine learning model and neural net models that predict intent from various conversational attributes using specific contexts—a context could be a timeframe between questions or statements or a snippet of speech with a beginning and an ending. The ensemble is a composite model that has a group of models that are individually good at detecting each of the various factors. Those factors are then combined to form a single intent score for a given context. At each step of the way, a payments planner module looks into the intent and confidence score calculated thus far and decides whether to use those signals to revise the plan or not.

The following chart shows how the intent scores and confidence scores may be adjusted over time during a conversation with the target party, where context C1-Cn are the Q/A data from the conversation in successive time windows.

| Context (Questions, Response in a given time window) | Intent score (−1 to 1) | Confidence score (1-100) |
| --- | --- | --- |
| C1 | 0 | 50 |
| C2 | 0.5 | 80 |
| C3 | −0.75 | 45 |
| C4 | 1 | 35 |
| C5 | −0.1 | 80 |
| ... | | |
| Cn | 0.5 | 100 |

The system starts with known variables of intent and ability from the historical records—this is used for generating baseline scores. Then agent scripting begins with asking casual questions such as 'how's the weather today?' to 'the last time you called us you mentioned your kid was sick, how's she doing now?'—the intent score to those questions are developed and construed as the baseline for a given customer.

In addition, a baseline of tone/speech/frequency (and other conversational attributes) is calibrated using publicly available data of how people react/respond to a lie detector test or similar approaches. Web scrapers and an ensemble of machine learning models can be deployed to continuously learn and iterate for furthering the baseline's accuracy by scraping question and answer clips available on the world wide web.

In the context of loan restructuring negotiations, once the baseline is created, the specific questions are asked with respect to revising the payment plan. The responses are then synthesized to predict the intent score. As an example, if the customer owes $10,000, and wishes to settle, the payment plan could have started with a baseline of $7,000 as a one-time settlement. Depending on the learning through the series of questions and therefore intent scoring—the settlement amount could change to $5,500 over 4 months with a higher success rate of payment.

The machine learning models are measured against their precision and recall metrics and are continuously updated using the feedback loop. The models are fed with the feedback on whether customers are making their payments as promised for historic revised plans. This feedback loop advances the system for better accuracy over time balancing for needs of all the key constituents involved in the marketplace/platform.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
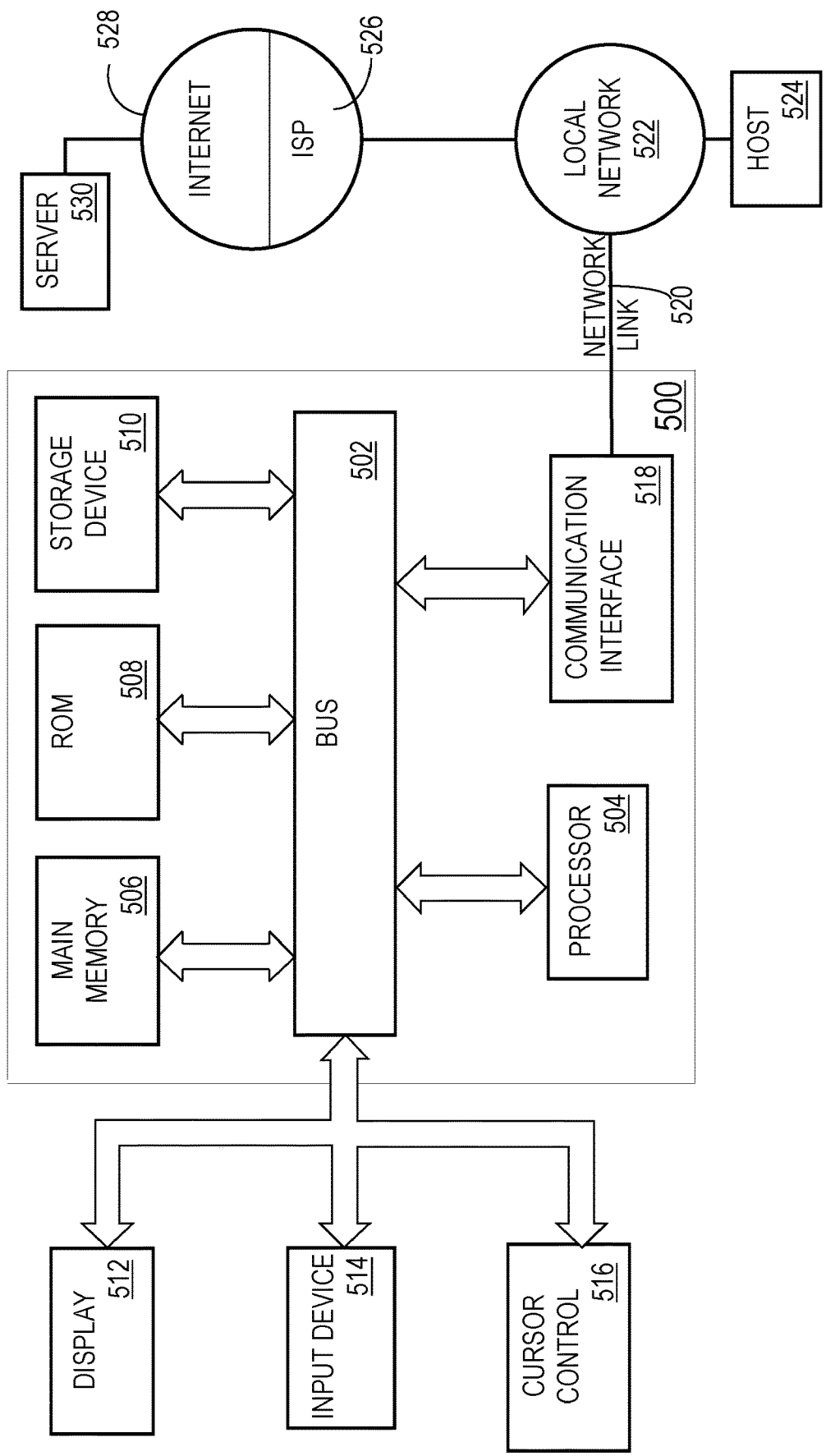
FIG. 5 is a block diagram of a computer system upon which the techniques described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
 training a machine learning system to predict intent of a target party in a current negotiation;
 wherein the training involves feeding the machine learning system:
 negotiation data for each of a plurality of prior negotiations between parties that did not include the target party; and
 outcome data for the plurality of prior negotiations, wherein the outcome data includes data indicating whether agreed-upon terms from each of the plurality of prior negotiations were complied with;
 wherein the outcome data includes:
 data for one or more negotiations that have a first label indicating agreed-upon terms were complied with; and
 data for one or more negotiations that have a second label indicating agreed-upon terms were not complied with;
 wherein, for each of the plurality of prior negotiations, the negotiation data is associated with a corresponding label from a set consisting of the first label and the second label;
 after training the machine learning system, feeding current negotiation data to the trained machine learning system to cause the trained machine learning system to generate a first intent score that predicts a likelihood that the target party intends to comply with terms under consideration in the current negotiation;

wherein the current negotiation data includes data about interactions with the target party during the current negotiation; and determining terms to offer to the target party in the current negotiation based, at least in part, on the first intent score.

2. The method of claim 1 wherein the current negotiation data includes first candidate terms, and the first intent score is for the first candidate terms.

3. The method of claim 2 wherein determining terms to offer includes:
determining whether the first intent score satisfies certain criteria;
responsive to determining that the first intent score does not satisfy the certain criteria, formulating second candidate terms;
causing the trained machine learning system to generate a second intent score by feeding current negotiation data with the second candidate terms to the trained machine learning system;
determining whether the second intent score satisfies the certain criteria; and
responsive to determining that the second intent score satisfies the certain criteria, offering the target party the second candidate terms.

4. The method of claim 3 wherein the certain criteria includes that a corresponding confidence score produced by the trained machine learning system exceeds a particular threshold.

5. The method of claim 1 wherein the negotiation data from prior negotiations, and the current negotiation data, include at least one of:
a party's tone of voice,
a party's choice of words,
the frequency that a party uses certain words,
a party's voice modulation,
a party's time of picking or making a call,
where a party is calling from,
who a party is calling with,
length of pauses before a party answers questions,
whether a party circumvents a question,
types of words used by a party, or
amount of time or rings until a party answers a call.

6. The method of claim 1 wherein the current negotiation data fed to the machine learning system includes information about video captured during the current negotiation.

7. The method of claim 6 wherein the information about video captured includes at least one of:
the target party's facial expressions,
how many times the target party nods their head,
the target party's attentiveness,
where the target party focusses their eyes.

8. The method of claim 1 wherein the current negotiation data fed to the machine learning system includes information derived from two or more of:
a text-based chat conversation with the target party;
one or more email messages from the target party;
a texting conversation with the target party;
a video chat with the target party;
a phone conversation with the target party; and
video captured during a live conversation with the target party.

9. A method comprising:
training a machine learning system to predict intent of a target party in a current negotiation;
wherein the training involves feeding the machine learning system:
negotiation data for each of a plurality of prior interactions with the target party; and
outcome data for the plurality of prior interactions, the outcome data including data that indicates whether the target party complied with commitments made during each of the plurality of prior interactions;
wherein the outcome data includes:
data for one or more negotiations that have a first label indicating agreed-upon terms were complied with; and
data for one or more negotiations that have a second label indicating agreed-upon terms were not complied with;
wherein, for each of the plurality of prior negotiations, the negotiation data is associated with a corresponding label from a set consisting of the first label and the second label;
after training the machine learning system, feeding current negotiation data to the trained machine learning system to cause the trained machine learning system to generate a first intent score that predicts a likelihood that the target party will comply with commitments of the target party during the current negotiation;
wherein the current negotiation data includes data about interactions with the target party during the current negotiation; and
determining terms to offer to the target party in the current negotiation based, at least in part, on the first intent score.

10. The method of claim 9 wherein the negotiation data from prior negotiations, and the current negotiation data, include at least one of:
a party's tone of voice,
a party's choice of words,
the frequency that a party uses certain words,
a party's voice modulation,
a party's time of picking or making a call,
where a party is calling from,
who a party is calling with,
length of pauses before a party answers questions,
whether a party circumvents a question,
types of words used by a party, or
amount of time or rings until a party answers a call.

11. The method of claim 9 wherein the current negotiation data fed to the machine learning system includes information about video captured during the current negotiation.

12. The method of claim 11 wherein the information about video captured includes at least one of:
the target party's facial expressions,
how many times the target party nods their head,
the target party's attentiveness,
where the target party focusses their eyes.

13. The one or more non-transitory computer-readable media of claim 9 wherein the current negotiation data includes first candidate terms, and the first intent score is for the first candidate terms.

14. The one or more non-transitory computer-readable media of claim 13 wherein determining terms to offer includes:
determining whether the first intent score satisfies certain criteria;
responsive to determining that the first intent score does not satisfy the certain criteria, formulating second candidate terms;
causing the trained machine learning system to generate a second intent score by feeding current negotiation data with the second candidate terms to the trained machine learning system;

determining whether the second intent score satisfies the certain criteria; and responsive to determining that the second intent score satisfies the certain criteria, offering the target party the second candidate terms.

15. The one or more non-transitory computer-readable media of claim 9 wherein the current negotiation data fed to the machine learning system includes information derived from two or more of:

a text-based chat conversation with the target party;
one or more email messages from the target party;
a texting conversation with the target party;
a video chat with the target party;
a phone conversation with the target party; and
video captured during a live conversation with the target party.

16. One or more non-transitory computer-readable media storing instructions which, when executed by one or more computing devices, cause:

training a machine learning system to predict intent of a target party in a current negotiation;

wherein the training involves feeding the machine learning system:

negotiation data for each of a plurality of prior negotiations between parties that did not include the target party; and outcome data for the plurality of prior negotiations, wherein the outcome data includes data indicating whether agreed-upon terms from each of the plurality of prior negotiations were complied with;

wherein the outcome data includes:

data for one or more negotiations that have a first label indicating agreed-upon terms were complied with; and data for one or more negotiations that have a second label indicating agreed-upon terms were not complied with;

wherein, for each of the plurality of prior negotiations, the negotiation data is associated with a corresponding label from a set consisting of the first label and the second label;

after training the machine learning system, feeding current negotiation data to the trained machine learning system to cause the trained machine learning system to generate a first intent score that predicts a likelihood that the target party intends to comply with terms under consideration in the current negotiation;

wherein the current negotiation data includes data about interactions with the target party during the current negotiation; and determining terms to offer to the target party in the current negotiation based, at least in part, on the first intent score.

17. One or more non-transitory computer-readable media storing instructions which, when executed by one or more computing devices, cause:

training a machine learning system to predict intent of a target party in a current negotiation;

wherein the training involves feeding the machine learning system:

negotiation data for each of a plurality of prior interactions with the target party; and outcome data for the plurality of prior interactions, the outcome data including data that indicates whether the target party complied with commitments made during each of the plurality of prior interactions;

wherein the outcome data includes:

data for one or more negotiations that have a first label indicating agreed-upon terms were complied with; and data for one or more negotiations that have a second label indicating agreed-upon terms were not complied with;

wherein, for each of the plurality of prior negotiations, the negotiation data is associated with a corresponding label from a set consisting of the first label and the second label;

after training the machine learning system, feeding current negotiation data to the trained machine learning system to cause the trained machine learning system to generate a first intent score that predicts a likelihood that the target party will comply with commitments of the target party during the current negotiation;

wherein the current negotiation data includes data about interactions with the target party during the current negotiation; and determining terms to offer to the target party in the current negotiation based, at least in part, on the first intent score.

\* \* \* \* \*